US012756136B2

(12) United States Patent
Lai et al.

(10) Patent No.: US 12,756,136 B2
(45) Date of Patent: Oct. 6, 2026

(54) BLADE-TYPE ELECTRICAL CONNECTOR FOR A VEHICLE

(71) Applicant: AVERTRONICS INC., Taichung City (CN)

(72) Inventors: Austin Lai, Taichung City (CN); Chao-I Chien, Taichung City (CN)

(*) Notice: Subject to any disclaimer, the term of this patent is extended or adjusted under 35 U.S.C. 154(b) by 283 days.

(21) Appl. No.: 18/408,445

(22) Filed: Jan. 9, 2024

(65) Prior Publication Data

US 2025/0226612 A1 Jul. 10, 2025

(51) Int. Cl.

*H01R 13/52* (2006.01)
*H01R 13/405* (2006.01)
*H01R 31/06* (2006.01)

(52) U.S. Cl.

CPC ......... *H01R 13/521* (2013.01); *H01R 13/405* (2013.01); *H01R 31/06* (2013.01)

(58) Field of Classification Search

CPC ..... H01R 13/521; H01R 13/405; H01R 31/06
USPC ......................................... 439/651, 736, 587
See application file for complete search history.

(56) References Cited

U.S. PATENT DOCUMENTS

| | | | | |
|---|---|---|---|---|
| 5,490,785 A * | 2/1996 | Hein | H01R 13/5221 439/620.08 |
| 6,821,162 B2 * | 11/2004 | Mott | B29C 45/14549 439/722 |
| 6,981,896 B2 * | 1/2006 | Su | H01R 43/24 439/693 |
| 7,070,460 B1 * | 7/2006 | Nagano | H01R 13/405 439/736 |
| 7,901,247 B2 * | 3/2011 | Ring | H01R 13/533 439/606 |
| 9,337,569 B2 * | 5/2016 | Kindermann | H01R 13/521 |
| 9,595,783 B2 * | 3/2017 | Pitzul | H01R 13/5216 |
| 10,276,972 B1 * | 4/2019 | Lai | H01R 13/521 |
| 10,992,074 B2 * | 4/2021 | Deng | H01R 13/113 |
| 11,081,825 B1 * | 8/2021 | Lai | H01R 13/64 |
| 11,128,077 B1 * | 9/2021 | Lai | H01R 13/111 |
| 11,309,657 B1 * | 4/2022 | Lai | H01R 13/629 |
| 2005/0202720 A1 * | 9/2005 | Burke | H01R 13/521 439/578 |

* cited by examiner

*Primary Examiner* — Hae Moon Hyeon
(74) *Attorney, Agent, or Firm* — Che-Yang Chen; Law Office of Michael Chen

(57) ABSTRACT

A blade-type electrical connector comprises a male connecting member and a female connecting member. The male connecting member has a plurality of male terminal blades, and a first connecting head is integrally injection-molded to cover a portion of the male terminal blades. The male terminal blades are arranged into two rows, and each of the male terminal blades has a front end and a rear end respectively formed into a first connecting end and a second connecting end. Each of the female slots has a third connecting end and a fourth connecting end, and the second connecting head has a frame body. Each of the fourth connecting ends is connected to a connecting wire, and at least one connecting wire is connected to form a wire set so as to adjust the properties of the electricity according to the number and positions of the connected female connecting ends.

4 Claims, 9 Drawing Sheets

BLADE-TYPE ELECTRICAL CONNECTOR FOR A VEHICLE

FIELD OF THE INVENTION

The present invention relates to an electrical connector and more particularly to a blade-type vehicle connector that is injection integrated forming and flexible for wiring application.

BACKGROUND OF THE INVENTION

The electrical connector can be widely used to transmit electric current and signals in the electromechanical field. The commonly known blade-type achieves connection by combining male terminal in the from of blade with elastic female terminals, and each of individual blades is capable of independently transmitting different types of electrical signals.

However, the conventional electrical connector has following disadvantages: (i) in the connection and utilization of electricity, numerous adjustments are often required, and different demands may occur for the parameters of electricity or signals when used, such as varying voltage or phase differences, resulting in different expected outcomes upon power supply. Therefore, there remains a need for a new and improved design for an electrical connector to overcome the problems presented above.

SUMMARY OF THE INVENTION

The present invention provides a blade-type electrical connector comprising a male connecting member and a female connecting member. The male connecting member has a plurality of male terminal blades, and a first connecting head is integrally injection-molded to cover a portion of the male terminal blades. The male terminal blades are arranged into two rows, and each of the male terminal blades has a front end and a rear end respectively formed into a first connecting end and a second connecting end, and the male terminal blade comprises two locating recesses symmetrically concaved on the upper and lower edges of the male terminal blade. The first connecting head has a covering portion to securely connect to the male terminal blades, and the covering portion comprises a plurality of locating protrudes formed along the surface of the locating recess so that the first connecting ends and the second connecting ends respectively protrude from the front surface and the rear surface of the first connecting head. A first water-stop pad is coupled at the front end of the first connecting head, and a plurality of second through holes formed on the surface of the first water-stop pad are adapted to be respectively passed by the first connecting ends of the male terminal blades. A second water-stop pad is coupled with the rear surface of the first connecting head. The male connecting member is inserted and connected to the female connecting member, and the female connecting member comprises a plurality of gate-type female slots and a second connecting head, and the second connecting head is integrally injection-molded to connect to the female slots, and the female slots are arranged into two rows. Each of the female slots has a third connecting end and a fourth connecting end, and the second connecting head has a frame body. A horizontal partition and a plurality of vertical partitions are formed inside space of the frame body to evenly divide the inside space into a plurality of separated terminal chambers, and the number and positions of the terminal chambers are arranged corresponding to the female terminal slots. The third connecting ends of the female terminal slots are respectively accommodated in the terminal chambers, and two wiring areas are respectively formed on both of the upper and lower sides of the horizontal partition, and the distance of wiring area is less than one-third of the height of the terminal chamber. The fourth connecting end located within the wiring area protrudes from the rear end of the second connecting end. Each of the left end and the right end of the fourth connecting end has a protruded connecting edge, and the two protruded connecting edges are located symmetrically. A plurality of connecting slots are formed on the second connecting head along the protruded connecting edges in the injection process, and a connecting base is integrally formed on the edge of the second connecting head, and a third water-stop pad is coupled with the front end of the connecting base. Each of the male terminal blades and the female terminal slots are arranged into two rows, and each of the fourth connecting ends is connected to a connecting wire, and at least one connecting wire is connected to form a wire set so as to adjust the properties of the electricity according to the number and positions of the connected female connecting ends.

Comparing with conventional electrical connector, the present invention is advantageous because: (i) by organizing and arranging the wire sets to connect to the fourth connecting ends through the connecting wires, the male connecting member and the female connecting member are easily connected even when the number of the male terminal blades and the female terminal slots are high, and the voltage and phase of the electrical connector can be adjusted by connecting different quantities and arranges of the fourth connecting ends through the connecting wires; (ii) the distance of wiring area is less than one-third of the height of the terminal chamber, so that the vertical distance between the two rows of the fourth connecting ends is smaller, thereby facilitating the interconnection; (iii) the first water-stop pad, the second water-stop pad, and the third water-stop pad are adapted to enhance the waterproof capability of the electrical connector so as to ensure the connection quality between the male terminal blades and the female terminal slots; (iv) the first connecting head and the second connecting head formed from injection molding are respectively connected on the male terminal blades and the female terminal slots, and with the locating recesses and the locating protrudes, the male terminal blades are firmly secured with the first connecting head; and (v) with the protruded connecting edges and the connecting slots, the female terminal slots are firmly secured with the second connecting head, so as to enhance both the manufacturing efficiency and quality of the male connecting member and the female connecting member.

DETAILED DESCRIPTION OF THE INVENTION

Figure 1:
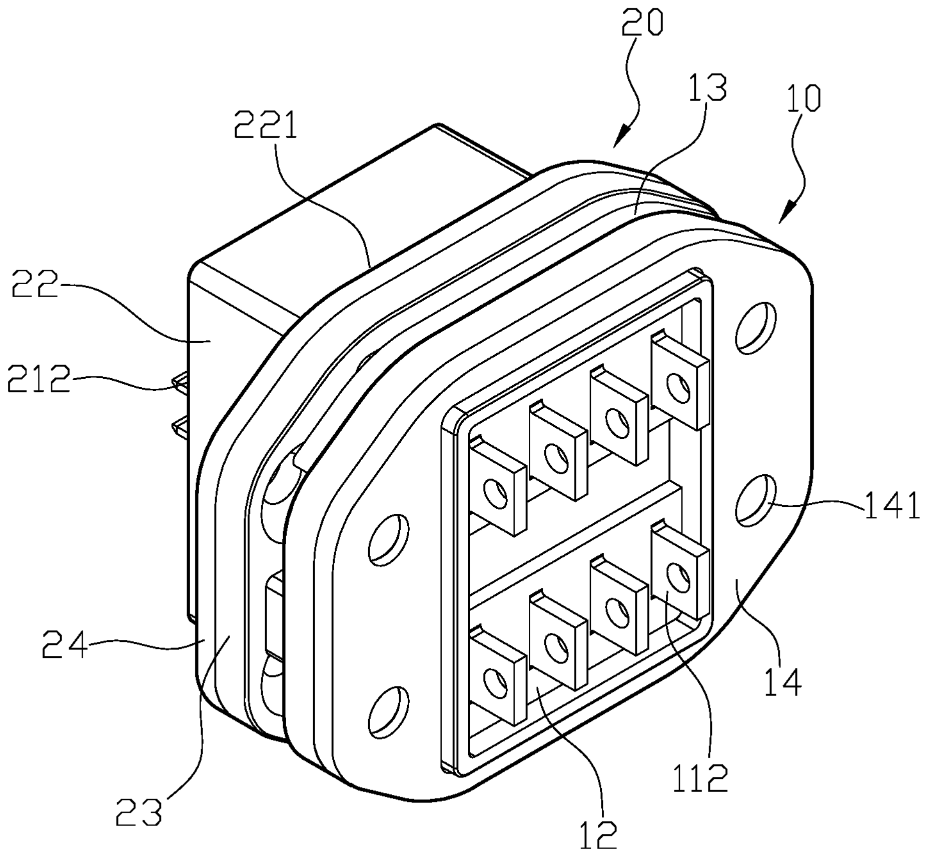
FIG. 1 is a three-dimensional assembly view of an electrical connector of the present invention.

The detailed description set forth below is intended as a description of the presently exemplary device provided in accordance with aspects of the present invention and is not intended to represent the only forms in which the present invention may be prepared or utilized. It is to be understood, rather, that the same or equivalent functions and components may be accomplished by different embodiments that are also intended to be encompassed within the spirit and scope of the invention.

Unless defined otherwise, all technical and scientific terms used herein have the same meaning as commonly understood to one of ordinary skill in the art to which this invention belongs. Although any methods, devices and materials similar or equivalent to those described can be used in the practice or testing of the invention, the exemplary methods, devices and materials are now described.

All publications mentioned are incorporated by reference for the purpose of describing and disclosing, for example, the designs and methodologies that are described in the publications that might be used in connection with the presently described invention. The publications listed or discussed above, below and throughout the text are provided solely for their disclosure prior to the filing date of the present application. Nothing herein is to be construed as an admission that the inventors are not entitled to antedate such disclosure by virtue of prior invention.

In order to further understand the goal, characteristics and effect of the present invention, a number of embodiments along with the drawings are illustrated as following:

Referring to FIGS. 1 to 6, the present invention provides a blade-type electrical connector comprising a male connecting member (10) and a female connecting member (20). The male connecting member (10) has a plurality of male terminal blades (11), and a first connecting head (12) is integrally injection-molded to cover a portion of the male terminal blades (11). The male terminal blades (11) are arranged into two rows, and each of the male terminal blades (11) has a front end and a rear end respectively formed into a first connecting end (111) and a second connecting end (112), and the male terminal blade (11) comprises two locating recesses (113) symmetrically concaved on the upper and lower edges of the male terminal blade (11). The first connecting head (12) has a covering portion (121) to securely connect to the male terminal blades (11), and the covering portion (121) comprises a plurality of locating protrudes (122) formed along the surface of the locating recess (113) so that the first connecting ends (111) and the second connecting ends (112) respectively protrude from the front and the rear surfaces of the first connecting head (12). A first water-stop pad (13) is coupled at the front end of the first connecting head (12), and a plurality of second through holes (131) formed on the surface of the first water-stop pad (13) are adapted to be respectively passed by the first connecting ends (111) of the male terminal blades (11). Moreover, a second water-stop pad (14) is coupled with the rear surface of the first connecting head (12).

The male connecting member (10) is inserted and connected to the female connecting member (20), and the female connecting member (20) comprises a plurality of gate-type female terminal slots (21) and a second connecting head (22), and the second connecting head (22) is integrally injection-molded to connect to the female terminal slots (21), and the female terminal slots (21) are arranged into two rows. Each of the female terminal slots (21) has a third connecting end (211) and a fourth connecting end (212), and the second connecting head (22) has a frame body (221). A horizontal partition (222) and a plurality of vertical partitions (223) are formed inside space of the frame body (221) to evenly divide the inside space into a plurality of separated terminal chambers (224), and the number and positions of the terminal chambers (224) are arranged corresponding to the female terminal slots (21). The third connecting ends (211) of the female terminal slots (21) are respectively accommodated in the terminal chambers (224), and two wiring areas (W) are respectively formed on both of the upper and lower sides of the horizontal partition (222), and the distance of wiring area (W) is less than one-third of the height of the terminal chamber (224). The fourth connecting end (212) located within the wiring area (W) protrudes from the rear end of the second connecting end (22). Each of the left end and the right end of the fourth connecting end (212) has a protruded connecting edge (213), and the two protruded connecting edges (213) are located symmetrically. A plurality of connecting slots (225) are formed on the second connecting head (22) along the protruded connecting edges (213) in the injection process, and a connecting base (23) is integrally formed on the edge of the second connecting head (22), and a third water-stop pad (24) is coupled with the front end of the connecting base (23).

Referring to FIGS. 7 to 12, each of the male terminal blades (11) and the female terminal slots (21) are arranged into two rows, and each of the fourth connecting ends (212) is connected to a connecting wire (30), and at least one connecting wire (30) is connected to form a wire set (40) so as to adjust the properties of the electricity according to the number and positions of the connected female connecting ends (212).

Figure 2:
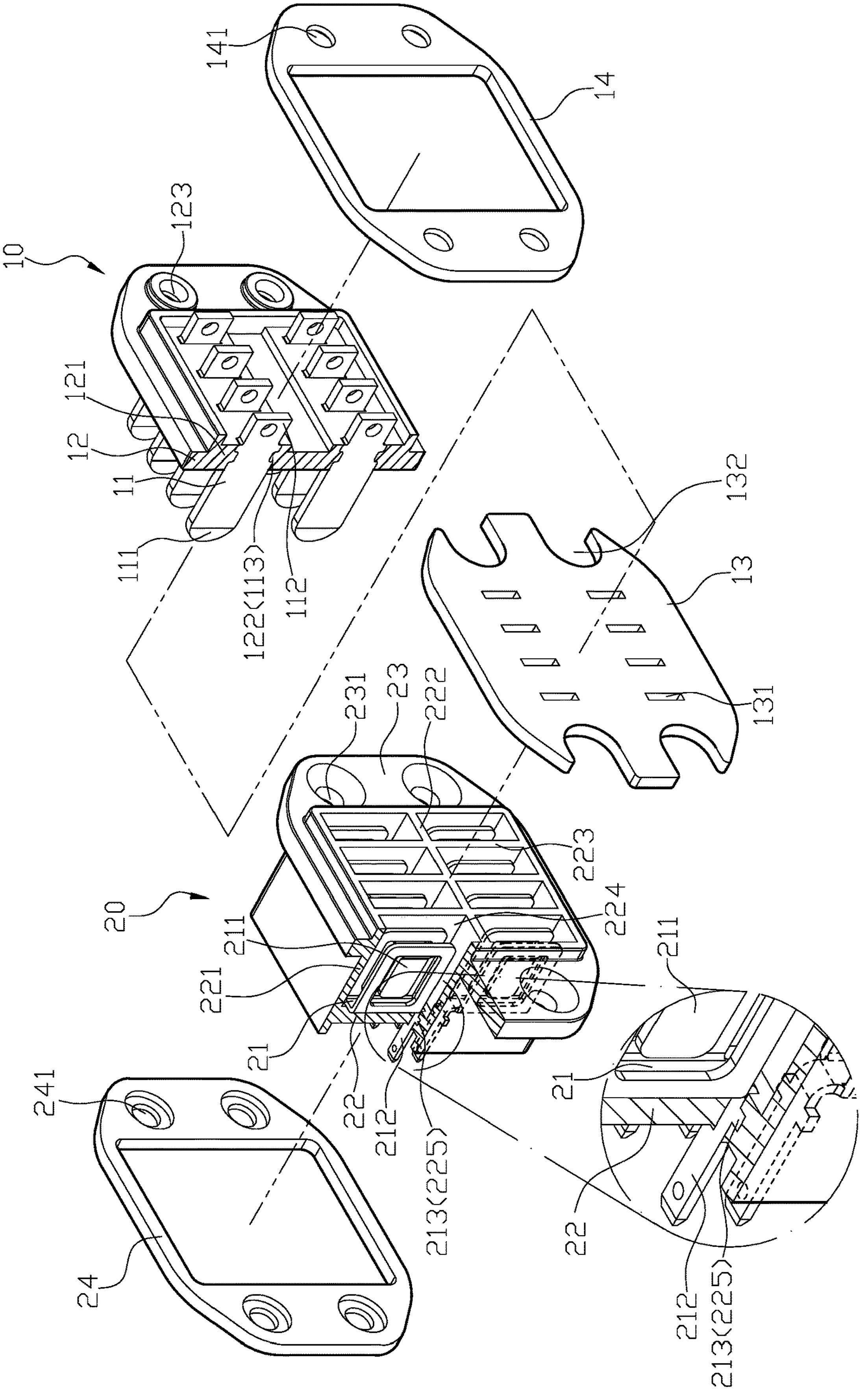
FIG. 2 is a three-dimensional exploded view of the electrical connector of the present invention.
Figure 3:
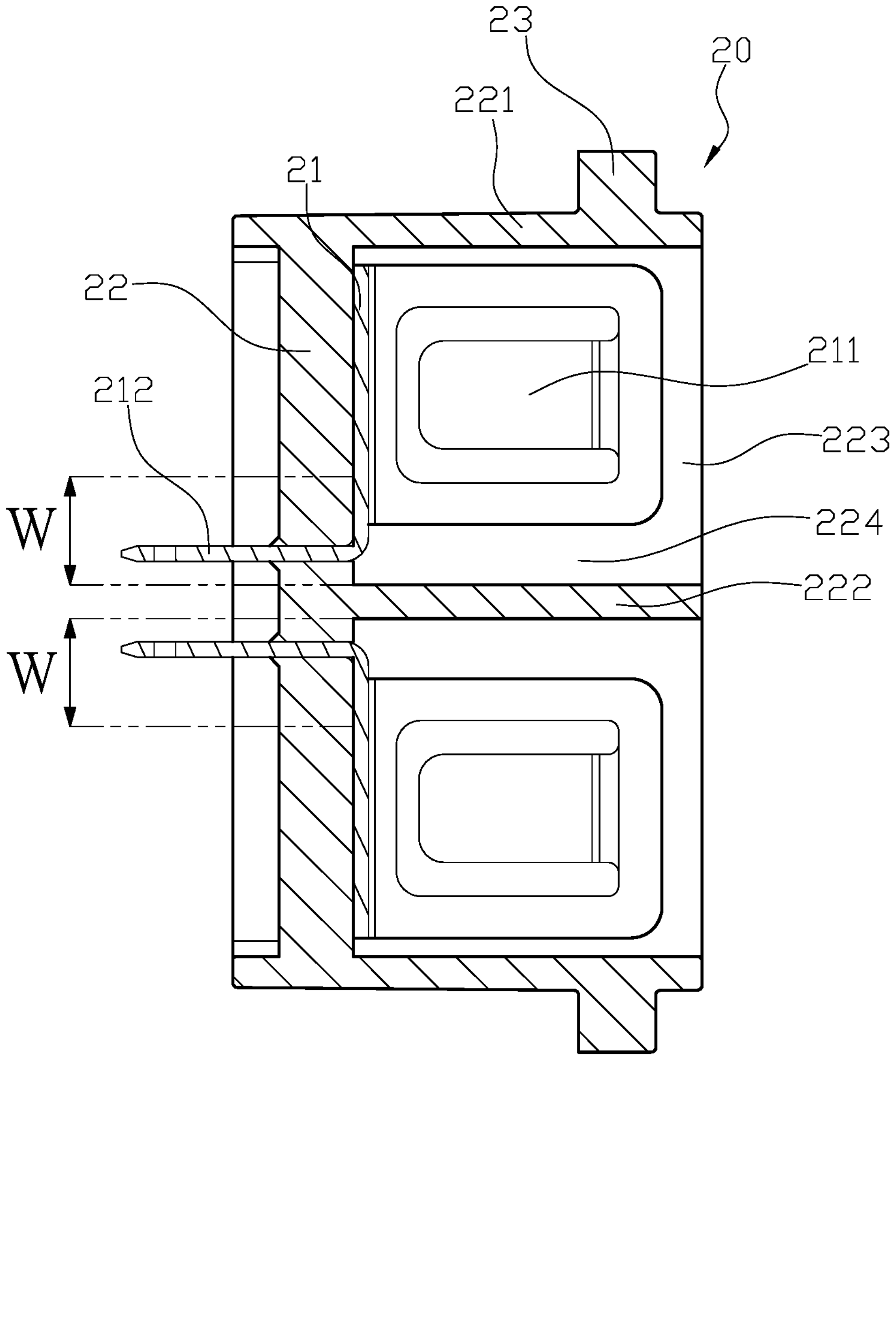
FIG. 3 is a sectional view of a female connecting member of the electrical connector in the present invention.
Figure 4:
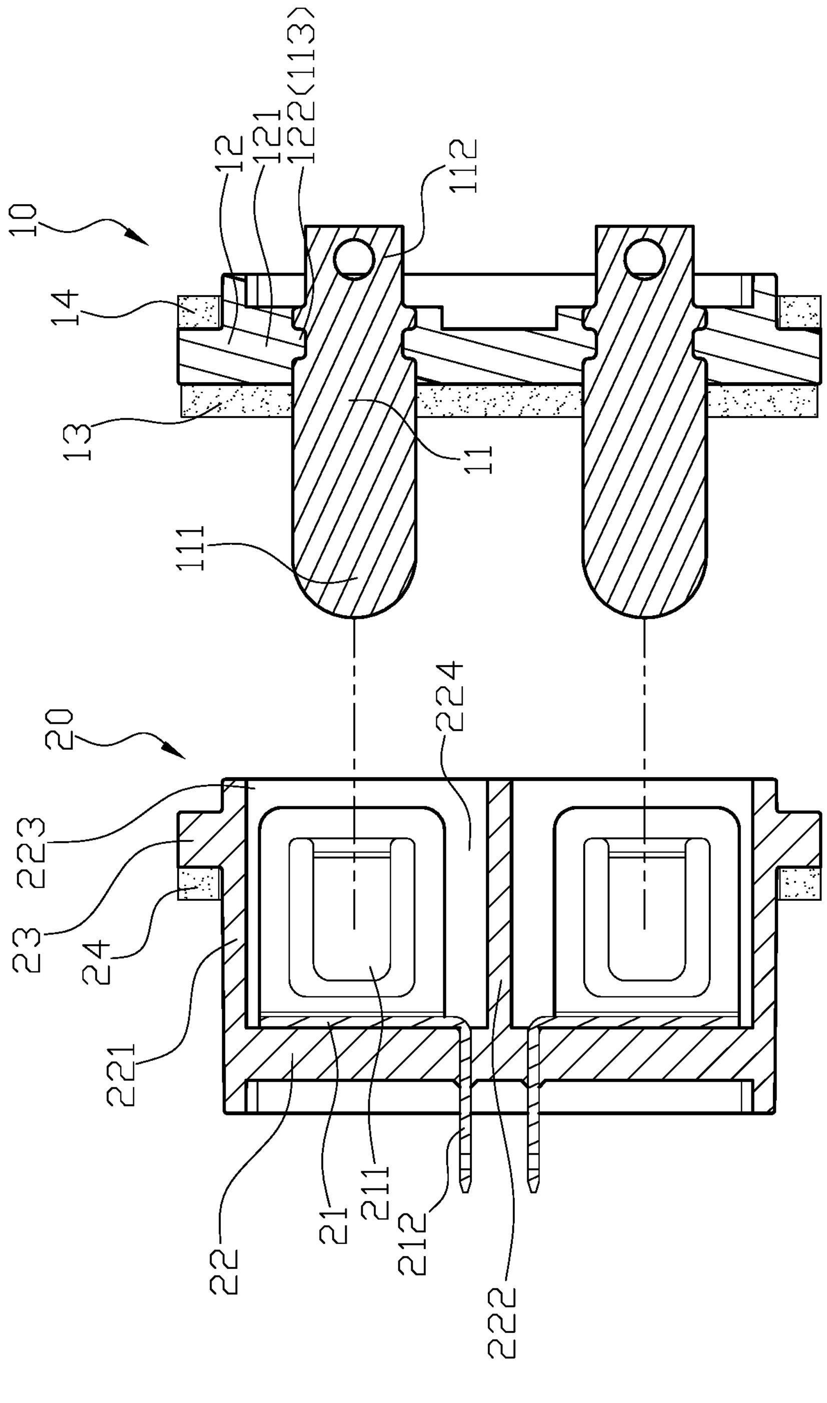
FIG. 4 is a sectional view illustrating a male connecting member is connected to the female connecting member of the electrical connector in the present invention.
Figure 5:
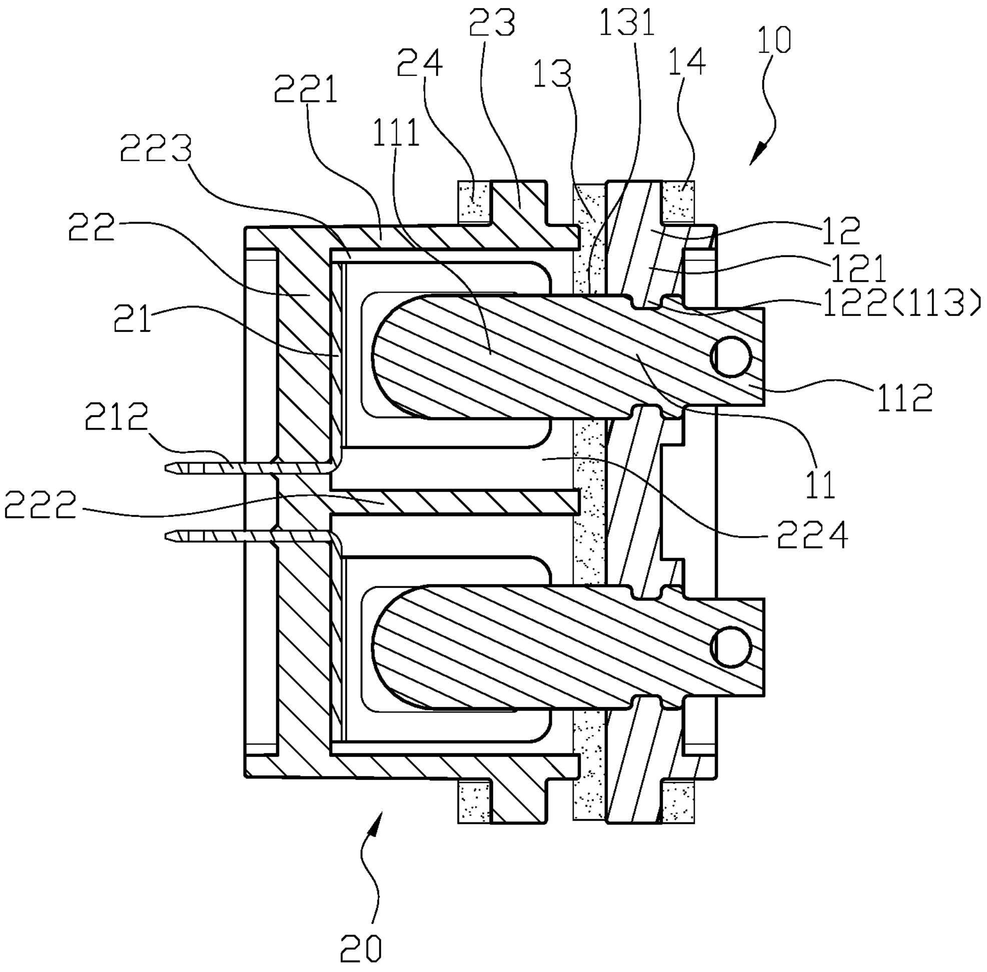
FIG. 5 is another section view illustrating the male connecting member is connected to the female connecting member of the electrical connector in the present invention.

Referring to FIGS. 1 and 2, each of the right and left ends of the first connecting head (12) has two first through holes (123) penetrating from front to rear of the first connecting head (12), and the first water-stop pad (13) comprises four openings (132) on two sides thereof at the positions corresponding to the four first through holes (123) while the second water-stop pad (14) has four first passing holes (141) on two sides thereof at the positions corresponding to the four first through holes (123). Furthermore, the connecting base (23) comprises four connecting holes (231) on two sides thereof at the positions corresponding to the four first through holes (123) while the third water-stop pad (24) has four second passing holes (241) on two sides thereof at the position corresponding to the four first through holes (123). Each of screws is adapted to screw through the first passing holes (141), the first through hole (123), the opening (132), the connecting holes (231), and the second passing holes (241) so as to secure the male connecting member (10) with the female connecting member (20).

Figure 6:
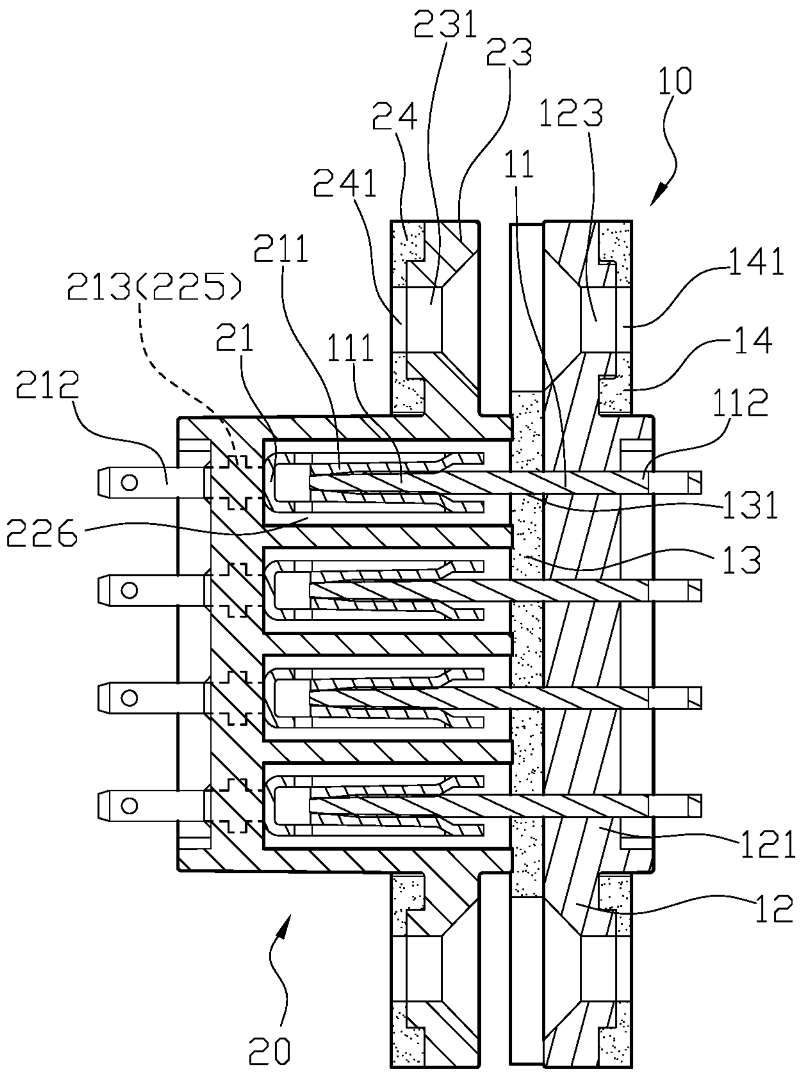
FIG. 6 is a top section view illustrating the male connecting member is connected to the female connecting member of the electrical connector in the present invention.

In one embodiment, referring to FIG. 6, the thickness of the third connecting end (211) of the female terminal slot (21) is smaller than the space in the terminal chamber (224), so that each of two first spaces (226) is formed between the outer surface of the female terminal slot (21) and the inner surface of the terminal chamber (224) so as to facilitate the injection production of the female connecting member (20) and the heat dissipation of the female terminal slot (21).

In another embodiment, referring to FIGS. 1 to 12, the male terminal blades (11) are arranged into two rows, and each row has four male terminal blades (11) to make total number of the male terminal blades (11) to be eight, and the number and positions of the female terminal slots (21) are arranged corresponding to the male terminal blades (11).

Figure 7:
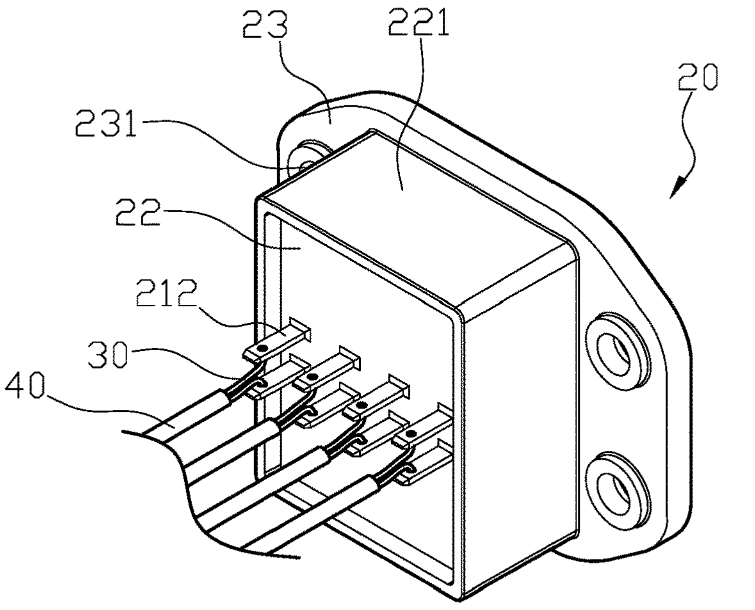
FIG. 7 is a three-dimensional view of a first embodiment of the wire connection of the electrical connector in the present invention.
Figure 8:
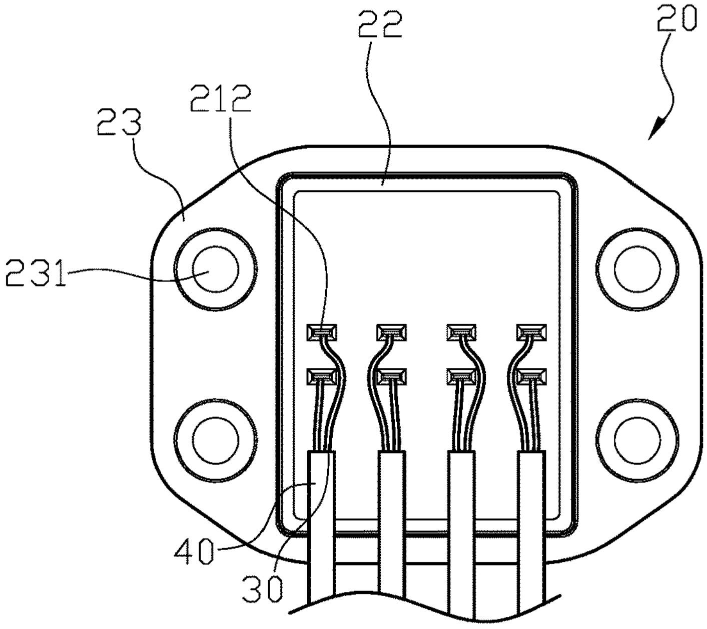
FIG. 8 is a schematic view illustrating the first embodiment of the wire connection of the electrical connector in the present invention.

In still another embodiment, referring to FIGS. 7 and 8, the electrical connector has four wire sets (40), and each of the wire sets (40) is connected to one fourth connecting end (212) located on the upper row and one fourth connecting end (212) located on the lower row through two connecting wires (30).

Figure 9:
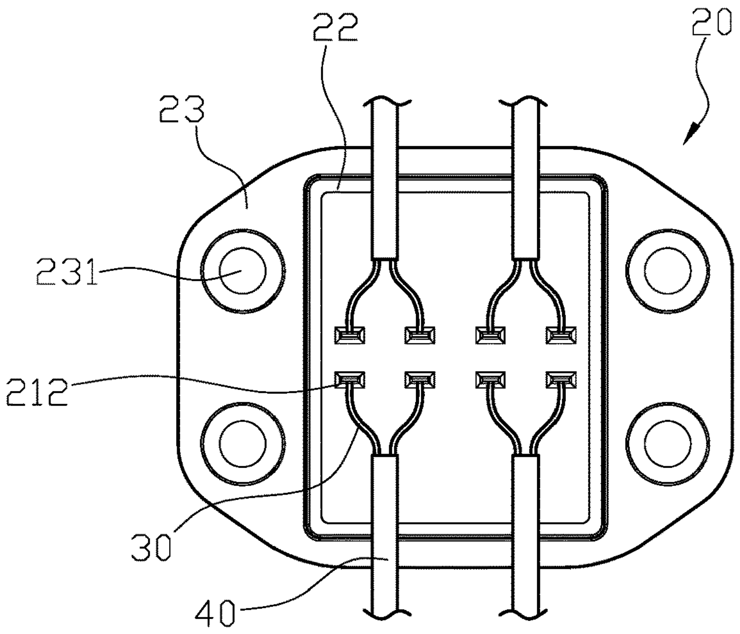
FIG. 9 is a schematic view of a second embodiment of the wire connection of the electrical connector in the present invention.

In a further embodiment, referring to FIG. 9, the electrical connector has four wire sets (40), and each of two upper wire sets (40) is connected to two adjacent fourth connecting ends (212) on the upper row through two connecting wires (30) while each of two lower wire sets (40) is connected to two adjacent fourth connecting ends (212) located on the lower row through two connecting wires (30).

Figure 10:
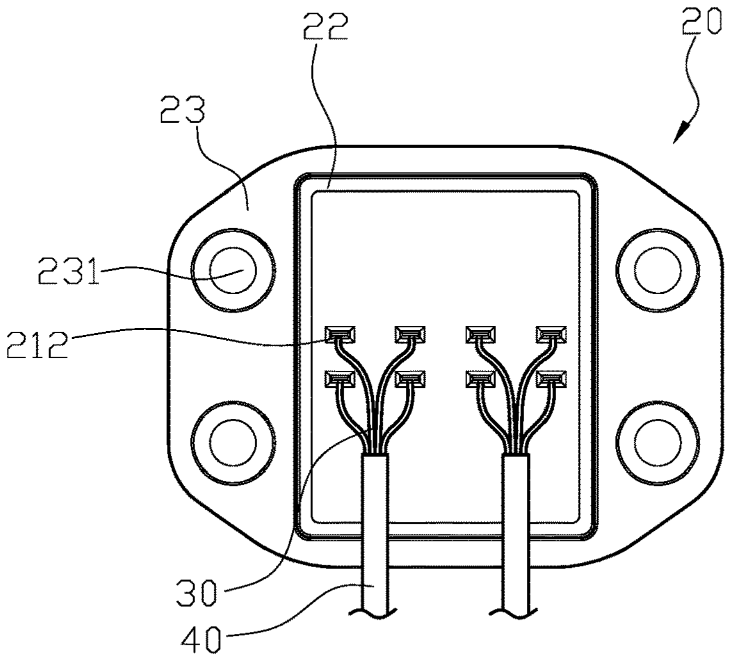
FIG. 10 is a schematic view of a third embodiment of the wire connection of the electrical connector in the present invention.

In still a further embodiment, referring to FIG. 10, the electrical connector has two wire sets (40), and one wire set (40) is connected to the left four fourth connecting ends (212) through four connecting wires (30) while the other wire set (40) is connected to the right four fourth connecting ends (212) through four connecting wires (30).

Figure 11:
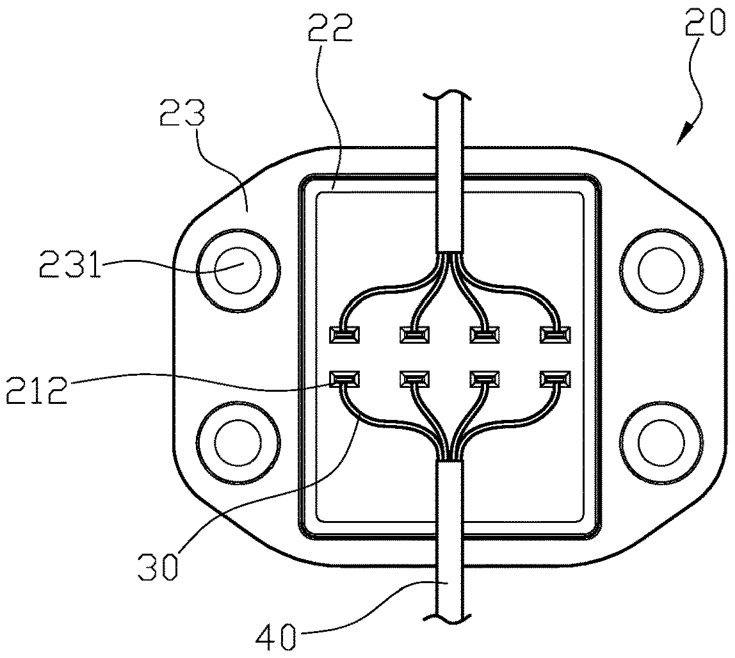
FIG. 11 is a schematic view of a fourth embodiment of the wire connection of the electrical connector in the present invention.

In an advantageous embodiment, referring to FIG. 11, the electrical connector comprises two wire sets (40), and one wire set (40) is connected to upper four fourth connecting ends (212) through four connecting wires (30) while the other wire set (40) is connected to lower four fourth connecting ends (212) through four connecting wires (30).

Figure 12:
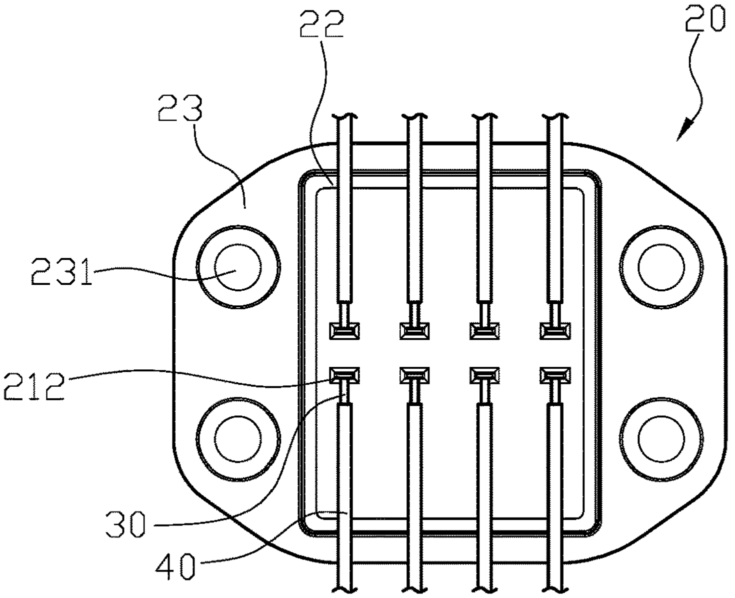
FIG. 12 is a schematic view of a fifth embodiment of the wire connection of the electrical connector in the present invention.

In still an advantageous embodiment, referring to FIG. 12, the electrical connector has eight wire sets (40), and each of the wire sets (40) is connected to one fourth connecting end (212) through one connecting wire (30).

Comparing with conventional electrical connector, the present invention is advantageous because: (i) by organizing and arranging the wire sets (40) to connect to the fourth connecting ends (212) through the connecting wires (30), the male connecting member (10) and the female connecting member (20) are easily connected even when the number of the male terminal blades (11) and the female terminal slots (21) are high, and the voltage and phase of the electrical connector can be adjusted by connecting different quantities and arranges of the fourth connecting ends (212) through the connecting wires (30); (ii) the distance of wiring area (W) is less than one-third of the height of the terminal chamber (224), so that the vertical distance between the two rows of the fourth connecting ends (212) is smaller, thereby facilitating the interconnection; (iii) the first water-stop pad (13), the second water-stop pad (14), and the third water-stop pad (24) are adapted to enhance the waterproof capability of the electrical connector so as to ensure the connection quality between the male terminal blades (11) and the female terminal slots (21); (iv) the first connecting head (12) and the second connecting head (22) formed from injection molding are respectively connected on the male terminal blades (11) and the female terminal slots (21), and with the locating recesses (113) and the locating protrudes (122), the male terminal blades (11) are firmly secured with the first connecting head (12); and (v) with the protruded connecting edges (213) and the connecting slots (225), the female terminal slots (21) are firmly secured with the second connecting head (22), so as to enhance both the manufacturing efficiency and quality of the male connecting member (10) and the female connecting member (20).

Having described the invention by the description and illustrations above, it should be understood that these are exemplary of the invention and are not to be considered as limiting. Accordingly, the invention is not to be considered as limited by the foregoing description, but includes any equivalents.

What is claimed is:

1. A blade-type electrical connector comprising a male connecting member and a female connecting member;

wherein the male connecting member has a plurality of male terminal blades, and a first connecting head is integrally injection-molded to cover a portion of the male terminal blades; the male terminal blades are arranged into two rows, and each of the male terminal blades has a front end and a rear end respectively formed into a first connecting end and a second connecting end, and the male terminal blade comprises two locating recesses symmetrically concaved on the upper and lower edges of the male terminal blade; the first connecting head has a covering portion to securely connect to the male terminal blades, and the covering portion comprises a plurality of locating protrudes formed along the surface of the locating recess so that the first connecting ends and the second connecting ends respectively protrude from the front surface and the rear surface of the first connecting head; a first water-stop pad is coupled at the front end of the first connecting head, and a plurality of first through holes formed on the surface of the first water-stop pad are adapted to be respectively passed by the first connecting ends of the male terminal blades; a second water-stop pad is coupled with the rear surface of the first connecting head;

wherein the male connecting member is inserted and connected to the female connecting member, and the female connecting member comprises a plurality of gate-type female terminal slots and a second connecting head, and the second connecting head is integrally injection-molded to connect to the female terminal slots, and the female terminal slots are arranged into two rows; each of the female terminal slots has a first female terminal connecting end and a second female terminal connecting end, and the second connecting head has a frame body; a horizontal partition and a plurality of vertical partitions are formed inside space of the frame body to evenly divide the inside space into a plurality of separated terminal chambers, and the number and positions of the terminal chambers are arranged corresponding to the female terminal slots; the first female terminal connecting ends of the female terminal slots are respectively accommodated in the terminal chambers, and two wiring areas are respectively formed on both of the upper and lower sides of the horizontal partition, and the distance of wiring area is less than one-third of the height of the terminal chamber; the second female terminal connecting end located within the wiring area protrudes from the rear end of the second connecting head; each of the left end and the right end of the second female terminal connecting end has a protruded connecting edge, and the two protruded connecting edges are located symmetrically; a plurality of connecting slots are formed on the second connecting head along the protruded connecting edges in the injection process, and a connecting base is integrally formed on the edge of the second connecting head, and a third water-stop pad is coupled with the front end of the connecting base; and wherein each of the male terminal blades and the female terminal slots are arranged into two rows, and each of the second female terminal connecting ends is connected to a connecting wire, and at least one connecting wire is connected to form a wire set to adjust electrical properties.

2. The blade-type electrical connector of claim 1, wherein each of the right and left ends of the first connecting head has two first through holes penetrating from front to rear of the first connecting head, and the first water-stop pad comprises four openings on two sides thereof at the positions corresponding to the four first through holes while the second water-stop pad has four first passing holes on two sides thereof at the positions corresponding to the four first through holes; the connecting base comprises four connecting holes on two sides thereof at the positions corresponding to the four first through holes while the third water-stop pad has four second passing holes on two sides thereof at the position corresponding to the four first through holes.

3. The blade-type electrical connector of claim 1, wherein the thickness of the first female terminal connecting end of the female terminal slot is smaller than the space in the terminal chamber, so that each of two first spaces is formed between the outer surface of the female terminal slot and the inner surface of the terminal chamber.

4. The blade-type electrical connector of claim 1, wherein the male terminal blades are arranged into two rows, and each row has four male terminal blades to make total number of the male terminal blades to be eight, and the number and positions of the female terminal slots are arranged corresponding to the male terminal blades.

* * * * *